United States Patent [19]
Rutledge

[11] 3,833,995
[45] Sept. 10, 1974

[54] VALVE STEM AND VALVE STEM TOOL

[76] Inventor: Seth E. Rutledge, P.O. 141, Lakeland, Fla. 33802

[22] Filed: Mar. 29, 1973

[21] Appl. No.: 345,829

[52] U.S. Cl. .............................................. 29/221.5
[51] Int. Cl. ............................................. B23p 19/04
[58] Field of Search .......... 29/221.5, 234, 235, 237, 29/451

[56] References Cited
UNITED STATES PATENTS

| | | | |
|---|---|---|---|
| 2,095,931 | 10/1937 | Kraft | 29/235 |
| 2,457,930 | 1/1949 | Smith | 29/235 |
| 3,387,354 | 6/1968 | Mossberg | 29/221.5 |

*Primary Examiner*—James L. Jones, Jr.
*Attorney, Agent, or Firm*—Clarence A. O'Brien; Harvey B. Jacobson

[57] ABSTRACT

A hand tool capable of handling and forcibly inserting and anchoring a rubber valve stem in an opening provided therefor in a tubeless tire rim. This tool is unique in that it, unlike prior art tools, accomplishes the insertion and mounting step from the exterior of the rim and, in so doing, obviates the necessity of laboriously freeing and disenaging the bead of the mounted tire from the rim. Novel end thrust means provides a projectible and retractable leading end engageable with the usual self-contained fitting. The end thrust means forcibly stretches and reduces the cross-sectional dimension of the valve stem for passage through the rim opening. Conversely, when retracted the valve stem returns to normal. The outstanding rim abutting flanges are lodged in place in a manner to seat and anchor the valve stem.

7 Claims, 4 Drawing Figures

PATENTED SEP 10 1974
3,833,995
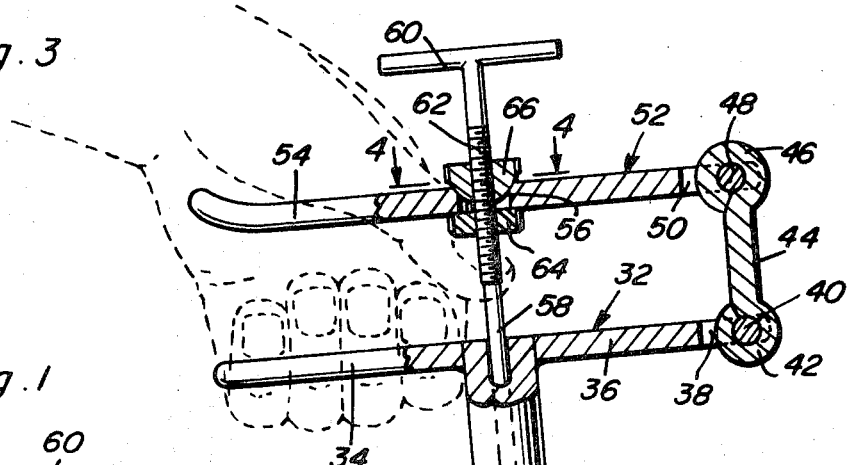
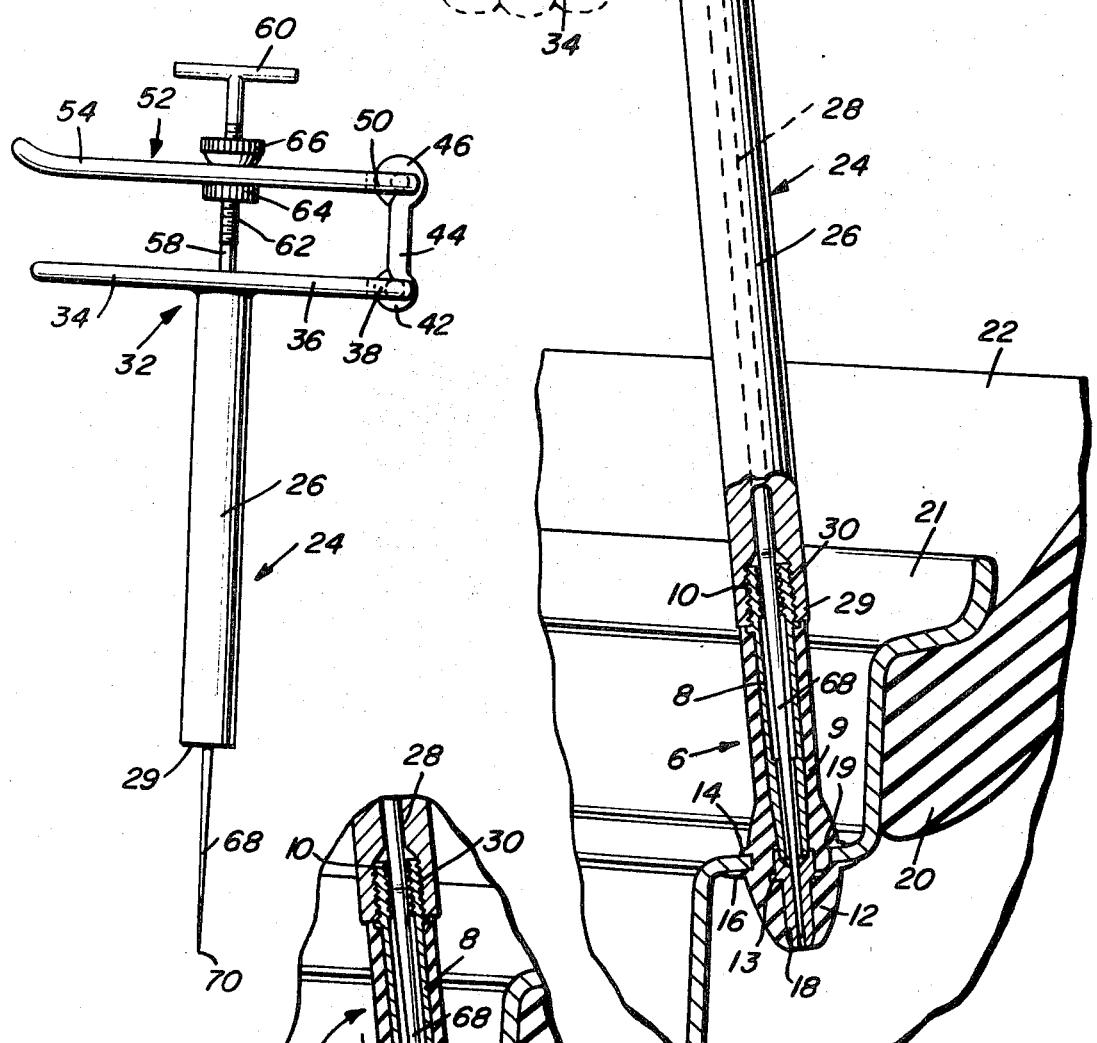
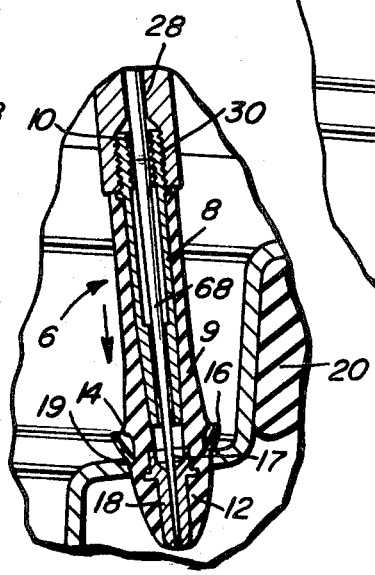
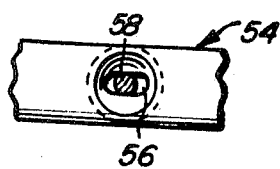

VALVE STEM AND VALVE STEM TOOL

This invention relates to a hand actuated tool which is implemented and properly adapted to forcibly stretch and elongate a unique rubber valve stem so that it can be inserted into the usual rim opening from the exterior of the tire-equipped rim, thus obviating the requirement of freeing and disengaging the bead of the tire in the manner usually required.

For background information reference may be made to U.S. Pat. Nos. 2,940,167 and 2,947,073 granted to Ralph K. Boyer. These patents pertain to manually usable tools which are expressly designed and adapted to handle and insert conventional rubber valve stems into the conventionally used valve stem opening. It should be noted, in this connection, that the valve stem has to be aligned and inserted into the rim opening from the interior surface of the rim while the tire is off the rim. The tool herein disclosed, unlike the above patented tools, is specifically designed and adapted for stretching and elongating the valve stem, whereby it can be inserted in the rim opening from the exterior of the rim, thus overcoming the necessity of disengaging the bead of the mounted tire from the rim. The valve stem, herein disclosed, unlike conventional valve stems which have a one-piece metal liner, is constructed with a two-piece liner including an inner segment and an outer segment having a threaded nipple thereon.

Briefly, the improved tool comprises a one piece T-shaped unit embodying an axially bored rigid shank having a forward end capable of securely and operatively joining said forward end with the usual screw-threaded nipple on the outward end of the outer liner segment of the valve stem. The rearward or outward end of the shank is provided with a cross-head, one end of which provides a handgrip. The other end is provided with a pivoted link which, in turn, is pivotally connected to a coordinating end of a hand actuatable lever. A thrust rod is threaded through a nut-equipped slot in said lever and then passed through and beyond the bore in said shank. The leading end of the rod is tapered and needle-like and, when projected by operating the lever, lodges and wedges itself in the bore of the inner liner segment in the enlarged head of the valve stem, whereupon the overall valve stem is forcibly stretched, is reduced in cross-sectional dimension and can then be piloted through the rim opening. When the rod is retracted, the valve stem resumes its natural shape and stays put, as desired.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is an elevational view showing the improved tool and how it is constructed and readied for use.

FIG. 2 is a suitably enlarged fragmentary view with parts shown in section and elevation and which illustrates how the needle-like leading end of the end thrust rod is lodged and wedged in place, how the rubber valve stem is distended, and how the flanged head is piloted through the usual tire rim opening.

FIG. 3 is an enlarged view with parts broken away and appearing in section and wherein the aforementioned end thrust rod has been retracted in a manner to restore the valve stem to its normally expanded self-anchoring state.

FIG. 4 is a fragmentary section taken on the section line 4—4 of FIG. 3.

The valve stem (FIGS. 2 and 3) is denoted by the numeral 6 and includes a rigid liner formed by an outer generally cylindrical and rigid metal liner segment 8 having a screw-threaded nipple 10 projecting from the outer end and a tapering inner end. The liner segment 8 is received in a rubber body 9 having an enlarged compressibly resilient blunt-pointed head 12 provided with a groove 13 defined by peripheral flanges 14 and 16. Also received in head 12 of body 9 is inner metal liner segment 18 having seat 17 at the inner end thereof which receives the valve core (not shown) and also telescopically receives the inner end of the liner segment 8 in a manner so that the liner segments 8 and 18 may move apart thus elongating the resilient body 9 so that the head 12 may be passed through the opening or hole 19 provided therefor in the tire rim 21 without moving the coacting bead 20 of the tire 22 away from or off the rim 21. The tool appearing in FIGS. 1 and 3 is structurally designed and adapted for stretching or elongating the valve body so that it can be inserted into the rim opening 19 from the exterior of the rim thus eliminating the necessity of disengaging the bead of the tire from the rim when installing a new valve stem.

The tool comprises a one-piece T-shaped unit 24 embodying an elongated axially bored rigid shank 26, the open-ended bore being denoted at 28. The forward or leading end portion 29 is counterbored and threaded as at 30 to provide a socket which is screwed onto nipple 10 on outer liner segment 8. The rearward or outward end of the shank is provided with a cross-head 32. One end portion 34 of the cross-head provides a handgrip. The other end portion 36 terminates in a fork 38 provided with an anchoring and hinge pin 40 for an associated eye 42 on one end of a link 44. The eye 46 at the other end of the link is connected with a similar hinge pin 48 mounted between the fork arms 50 of a manually actuatable lever 52. The free left hand end portion of the lever is fashioned into a handle or handgrip 54 which is opposed to and cooperates with a handgrip 34. The intermediate portion of the lever is provided with an elongated slot 56.

A thrust rod 58 is reciprocally mounted in bore 28 and is of a length appreciably greater than the length of the shank 26. The upper or outer end is provided with finger-gripping means or T-handle 60 and the portion adjacent thereto is screw-threaded as at 62 and the threaded portion is provided with adjusting and assembling nuts, one nut 64 abutting a coacting inner surface of the slotted portion of the lever. The other companion nut 66 has a convex surface cooperating with the lever 52 to enable straight line movement of rod 58. Both nuts have knurled finger-gripping surfaces. It will be seen particularly in FIGS. 1–3 that the forward end portion of the thrust rod is gradually tapered as at 68 and terminates in a needle-like point 70. This pointed end portion is adapted to be forcibly shoved and lodged in the bore of the inner liner segment 18 of valve stem 6. The outer liner segment 8 is bonded to the outer end portion of the body 9 and the inner liner segment 18 is bonded to the inner end portion of body 9 so that when the point 70 is lodged in the segment 18 as shown in FIG. 3 and the thrust rod is moved in a direction toward the inner segment 18 while shank 26 is connected with nipple 10, the body 9 is stretched and elongated and consequently reduced in cross-sectional dimension in such a manner that the head 12 can be lined up with and passed through the rim opening 19. When thus stretched the valve body 9 can be moved from the exterior of the rim through the opening 19 in a manner to obviate the necessity of disengaging the bead 20 of the tire 22 from the rim 21 when installing the valve stem. When the thrust pressure on the segment 18 and nipple 10 is relieved, the head 12 resumes its normal expanded state and flanged portions 14 and 16 sealingly engage the surfaces of the rim adjacent to the rim opening 19 and lodge themselves in anchored position as shown in FIG. 3 with the groove 13 receiving the periphery of opening 19. Then the spring-loaded valve core (not shown) is screw-threaded into the liner segment 8 in a well known manner to enable inflation and deflation of the tubeless tire.

The construction, manner of use, and features and advantages are thought to be clear from the preceding description and views of the drawing. Accordingly, a more extended description is thought to be unnecessary.

In conclusion, it should be mentioned here that a suitable pulling tool will, of course, have to be used to remove the old valve stem (not shown) from the rim opening 19 and thus pave the way for installation of the above-mentioned replacement valve stem. The pulling tool will have a threaded socket to engage nipple 10 so that tension may be exerted on the valve stem to extract it from the rim opening by deformation of flange 16 and the adjacent portion of the rubber body 9.

Finally, the herein disclosed tool can, of course, be (1) satisfactorily used to not only dislodge or pull the "old" valve stem out and (2) also used to free and take the new and improved valve stem out.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve stem and tool assembly, said tool being manually usable and adapted to position, forcibly insert and mount and anchor the valve stem in an opening such as is commonly provided therefor in a tubeless tire rim, said tool serving to carry out and accomplish the progressive insertion and mounting steps while assuming a wholly accessible position relative to the exterior of the rim and obviating the necessity of freeing and dislodging the bead of the tire from the rim on which it is mounted, said valve stem including a resilient body and two-piece rigid segmental liner, said tool comprising an elongated rigid sleeve, the bore of said sleeve opening through forward and rearward ends of the sleeve, the open forward end being provided with a counterbore which is screw-threaded to provide a socket, the outer liner segment having a threaded nipple screwed into the socket, the rearward end of said sleeve being provided with diametrically opposite outstanding members constituting handling means, an end thrust rod slidingly mounted in the bore of said sleeve and having a forward end projecting beyond the corresponding end of the sleeve and a rearward end, means operatively connecting said rearward end to said handling means, and means on the forward end of the thrust rod engaging the inner liner segment for moving the liner segments apart and stretching the resilient body for reducing the cross-sectional area thereof to enable insertion into the rim opening.

2. The valve stem tool defined in and according to claim 1, and wherein said last-named means is characterized by a lever which is opposed to and spaced from the handling means, corresponding end portions of said lever and handling means being operatively connected by a link which, in turn, is pivotally connected to the handling means and lever, respectively.

3. The valve stem tool defined in and according to claim 2, and wherein a median portion of said lever is provided with an elongated slot, a portion of said rod passing through and beyond said slot and terminating in fingergrips, said portion of the rod being screw-threaded, and cooperating nuts, one nut screwed on the threads and being located on and engageable with a coacting surface of the slotted portion of the lever, the other nut being situated on the other side of the lever and engaging the coacting slotted surface portion of said lever.

4. The valve stem tool defined in and according to claim 2, and wherein a median portion of said lever is provided with an elongated slot, a portion of said rod passing through and beyond said slot and terminating in fingergrips, said portion of the rod being screw-threaded, and cooperating nuts, one nut screwed on the threads and being located on and engageable with a coacting surface of the slotted portion of the lever, the other nut being situated on the other side of the lever and engaging the coacting slotted surface portion of said lever, said last-named nut having a convex surface and said convex surface being in adjustable connection with said lever.

5. A valve stem and hand-manipulatable tool assembly for inserting the valve stem, from the exterior side, into an opening in a tire rim, said valve stem including a resilient body and having inner and outer rigid segmental liners received therein, said tool having a hollow elongated rigid sleeve, one hollow end being threaded to receive a threaded portion of the outer segmental liner, the other end of said sleeve having relatively movable handle means attached thereto, a thrust rod connected to the said handle means, passing through said hollow sleeve, and extending beyond the sleeve at the other extremity of the sleeve, for reciprocation by said handle means within said sleeve, the end of the thrust rod opposite said handle means engaging the inner segmental liner for moving the inner and outer liners apart to stretch the resilient body of the valve stem to reduce its cross-sectional area for insertion in the rim opening.

6. A tool for inserting from the outside a valve stem through an opening provided in a tire rim, said tool including a rigid shank having a central bore extending throughout its length receiving a thrust rod having threaded means at one end and a needle-like point at the other end, said threaded means at one end being connected by lever and pivot means to a hand-manipulated, articulated portion of said tool to give said thrust rod a reciprocating motion within said bore, said needle-like end being insertable through a central portion of a valve stem and the rigid shank being threadable on a threaded portion of a valve stem so that when the tool is in the valve stem inserting position, the thrust rod is extended to reduce the cross-section of the valve stem for final seating in a tire rim.

7. The tool of claim 6 wherein the needle-like end is engageable with an inner segment of an inner and outer rigid segmental liner combination within a valve stem and the threaded portion of the rigid shank is connectible to a threaded portion of an inner rigid segmental liner, so that when the reciprocating motion of the thrust rod within the shank occurs, the needle-like end of the thrust rod and the threadable portion of the shank will cause a forcing apart of the aforementioned inner and outer liners to reduce the cross-section of a resilient body portion of the valve stem at the time it is being inserted in an opening in a tire rim.

* * * * *